(12) United States Patent
Malas et al.

(10) Patent No.: US 11,690,010 B2
(45) Date of Patent: *Jun. 27, 2023

(54) NORMALIZATION OF DATA ORIGINATING FROM ENDPOINTS WITHIN LOW POWER WIDE AREA NETWORKS (LPWANS)

(71) Applicant: CABLE TELEVISION LABORATORIES, INC., Louisville, CO (US)

(72) Inventors: Daryl Malas, Broomfield, CO (US); Robert M. Lund, Boulder, CO (US); Brandon Schaffer, Loveland, CO (US); Steve Johnson, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/799,157

(22) Filed: Feb. 24, 2020

(65) Prior Publication Data

US 2020/0196238 A1 Jun. 18, 2020
US 2022/0150825 A9 May 12, 2022

Related U.S. Application Data

(63) Continuation of application No. 15/844,087, filed on Dec. 15, 2017, now Pat. No. 10,575,250.

(60) Provisional application No. 62/434,610, filed on Dec. 15, 2016.

(51) Int. Cl.
*H04W 52/02* (2009.01)
*H04L 69/06* (2022.01)
*H04L 67/125* (2022.01)
*H04L 69/08* (2022.01)
*H04L 67/12* (2022.01)
*H04L 69/18* (2022.01)
*H04L 67/565* (2022.01)

(52) U.S. Cl.
CPC ........ *H04W 52/0216* (2013.01); *H04L 67/12* (2013.01); *H04L 67/125* (2013.01); *H04L 67/565* (2022.05); *H04L 69/06* (2013.01); *H04L 69/08* (2013.01); *H04L 69/18* (2013.01); *Y02D 30/70* (2020.08)

(58) Field of Classification Search
None
See application file for complete search history.

(56) References Cited

U.S. PATENT DOCUMENTS

| | | | | |
|---|---|---|---|---|
| 9,878,663 | B1 * | 1/2018 | Kochura | B60W 50/0098 |
| 10,176,435 | B1 * | 1/2019 | Sarkar | G06N 20/00 |
| 2008/0129466 | A1 * | 6/2008 | Ruy | H04L 47/10 340/286.02 |

(Continued)

OTHER PUBLICATIONS

LoRa Specification V1.0, LoRa Alliance Inc (Year: 2015).*

*Primary Examiner* — Kodzovi Acolatse
(74) *Attorney, Agent, or Firm* — PdZ Patent Law, PLLC (57) ABSTRACT

The normalization of data originating from endpoints within low power wide area networks (LPWANs) is contemplated. The normalization may be beneficial to facilitate normalizing data when collected and/or communicated according to disparate protocols, languages, formats, syntaxes, structures, etc. of the endpoints and/or the LPWANs so as to enable commonization of the data prior to being interfaced with applications or other entities intending to make use thereof.

6 Claims, 2 Drawing Sheets

(56) References Cited

U.S. PATENT DOCUMENTS

| | | | | |
|---|---|---|---|---|
| 2015/0347486 | A1* | 12/2015 | Julia | G06F 16/2291 |
| | | | | 707/736 |
| 2015/0378549 | A1* | 12/2015 | Layne, Jr. | G06F 3/0488 |
| | | | | 345/173 |
| 2016/0232042 | A1* | 8/2016 | Ritter | G06F 8/427 |
| 2016/0328719 | A1* | 11/2016 | Ananchaperumal | H04W 4/70 |
| 2017/0006135 | A1* | 1/2017 | Siebel | H04L 69/40 |
| 2017/0011105 | A1* | 1/2017 | Shet | G06Q 10/00 |
| 2017/0053015 | A1* | 2/2017 | Liongosari | G06F 16/24575 |
| 2017/0093952 | A1* | 3/2017 | Kumar | H04W 4/20 |
| 2017/0230074 | A1* | 8/2017 | Rose | H03F 3/24 |
| 2017/0237623 | A1* | 8/2017 | Hopkins | H04L 41/022 |
| | | | | 709/223 |
| 2017/0264501 | A1* | 9/2017 | Mathen | H04L 41/16 |
| 2017/0329918 | A1* | 11/2017 | Kim | G06F 16/24578 |
| 2017/0359417 | A1* | 12/2017 | Chen | H04W 60/04 |
| 2017/0367132 | A1* | 12/2017 | Sinha | H04W 76/11 |
| 2017/0374490 | A1* | 12/2017 | Schoppmeier | H04L 67/12 |
| 2018/0007115 | A1* | 1/2018 | Nedeltchev | H04L 67/10 |
| 2018/0084073 | A1* | 3/2018 | Walsh | H04L 67/2819 |
| 2018/0084085 | A1* | 3/2018 | Shanmugasundaram | H04L 12/2818 |
| 2018/0092151 | A1* | 3/2018 | Liu | H04W 24/02 |
| 2018/0101149 | A1* | 4/2018 | Moss | G05B 15/02 |
| 2018/0132177 | A1* | 5/2018 | Gandhi | H04W 52/0235 |
| 2018/0167370 | A1* | 6/2018 | Frahim | H04L 63/102 |
| 2018/0167982 | A1* | 6/2018 | Lee | H04W 76/10 |
| 2018/0176862 | A1* | 6/2018 | Malas | H04L 69/08 |
| 2018/0191666 | A1* | 7/2018 | Rahman | H04L 61/1511 |
| 2022/0128388 | A1* | 4/2022 | Raduchel | G01F 1/696 |

\* cited by examiner

NORMALIZATION OF DATA ORIGINATING FROM ENDPOINTS WITHIN LOW POWER WIDE AREA NETWORKS (LPWANS)

CROSS-REFERENCE TO RELATED APPLICATIONS

This application is a continuation of U.S. patent application Ser. No. 15/844,087, filed Dec. 15, 2017, which application claims the benefit of U.S. provisional application No. 62/434,610 filed Dec. 15, 2016, the disclosure of which is incorporated in its entirety by reference herein.

TECHNICAL FIELD

The present invention relates to normalization of data originating from endpoints within low power wide area networks (LPWANs), such as but not necessary limited to normalizing data when collected and/or communicated according to disparate protocols, languages, formats, syntaxes, structures, etc. of the endpoints and/or the LPWANs so as to enable commonization of the data prior to being interfaced with applications or other entities intending to make use thereof.

BACKGROUND

The Internet of Things (IoT) is a growing industry comprised of a massive number of devices that connect to each other to benefit our lives. Examples of these include thermostats, security cameras, voice-commanded personal digital assistants (PDAs) and wearable electronics that may be configured to facilitate any number of operations, such as to enable refrigerators to talk with the Internet to order milk and wearable electronics to tell you when to step more to meet your daily exercise goals. A new area of IoT involves the use of sensors designed for wirelessly transmitting information periodically over long distances for years on a single battery. The infrastructure to support these connected devices is commonly referred to as a low power wide area network (LPWAN). LPWANs may be designed to cover large geographical areas in a manner intended to minimize the amount of power required for sensors to interact with the network. The nature of a LPWAN network potentially allows IoT devices to run for years on small batteries, occasionally sending out small packets of data, waiting for a short time for response messages, and then closing the connection until more data needs to be sent. Devices can also be set up so that they are always listening for messages from their applications, though this requires more power and may be more appropriate for devices that are, plugged in to a wall socket or otherwise operational independently of batteries.

IoT devices can utilize the LPWAN networks to send small data packets to any number of gateways that may be in a several-kilometer range of a sensor, such as in accordance with the LoRaWAN or other suitable wireless protocol. The gateways can then use more traditional communications, such as wired and/or wireless Internet connections, to forward the messages to a network-server that then validates the packets and forwards the application payload to an application-server or other back end processing element. One non-limiting aspect of the present invention contemplates normalizing data being communicated over LPWANs or other suitable networks so as to minimize backend or application processing of the data when originating from IoT devices, sensors, endpoints, hardware or other components having different processes, protocols, architectures, properties, etc. for structuring, formatting and communicating the data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
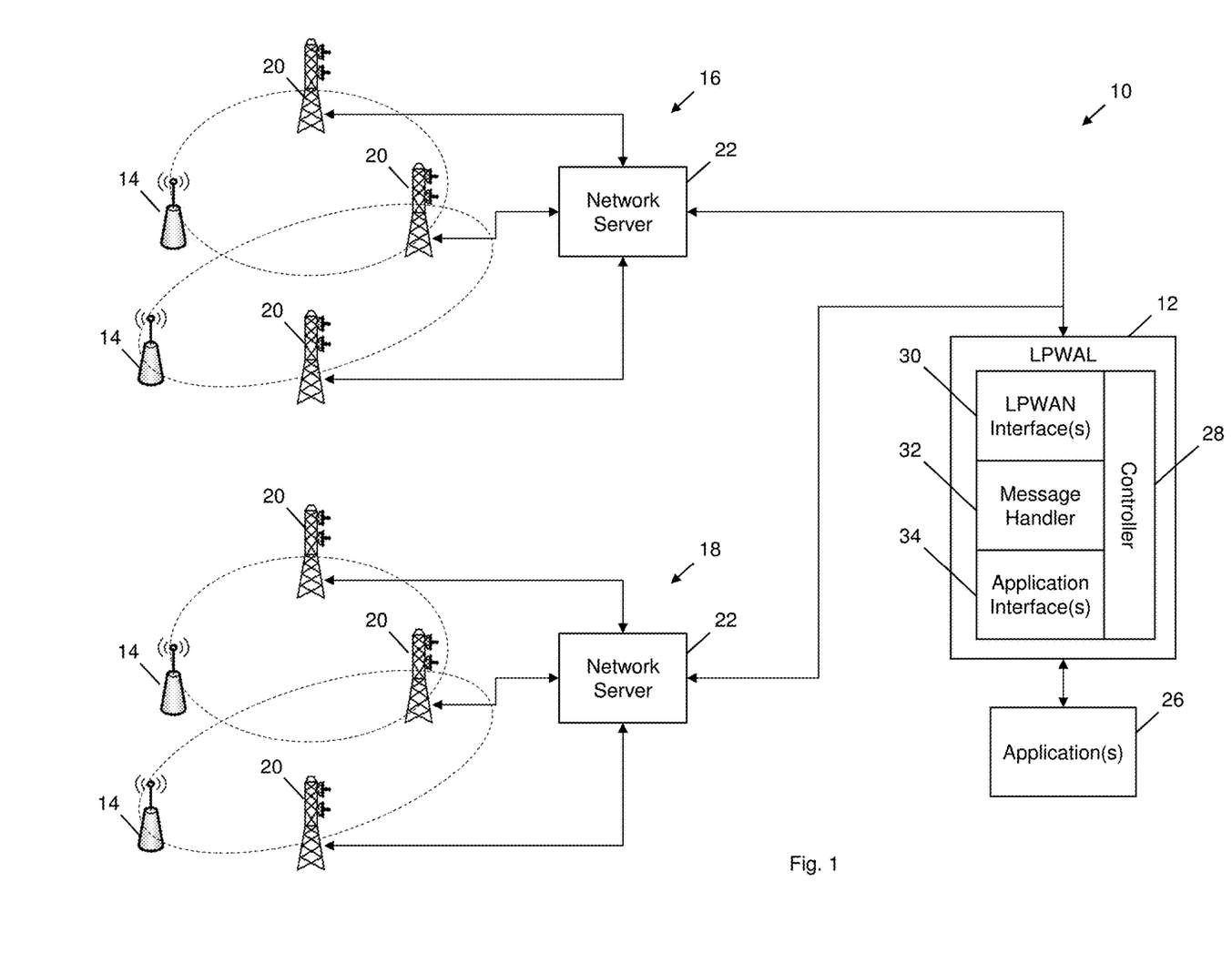
FIG. 1 illustrates a system for normalizing data communications in accordance with one non-limiting aspect of the present invention.

FIG. 1 illustrates a system 10 for normalizing data communications in accordance with one non-limiting aspect of the present invention. The contemplated normalization may be facilitated with an abstraction layer 12 positioned to facilitate translating, mapping, converting, encoding and/or otherwise manipulating data traversing therethrough for purposes of commonizing the data to an agreed-upon or standardized architecture, format, syntax, protocol, structure, language or other construct. The present invention is predominately described for exemplary purposes with respect to normalizing data when originating from a plurality of endpoints 14 in communication with a plurality of low power wide area networks (LPWANs) 16, 18, such as to address the above-identified possibility of network operators being tasked with supporting communication of sensor data or other information in the future when the proliferation of the data originating endpoints 14 is expected to reach levels and/or types of traffic flow believed to be best supported with LPWANs 16, 18. The present invention, however, is not necessarily limited to LPWANs 16, 18 and fully contemplates its use and application in facilitating data normalization within virtually any communication network and/or for data originating from locations other than the endpoints 14, including normalization of data being transmitted to the endpoints 14.

The LPWANs 16, 18 are generically illustrated with the endpoints 14 communicating with one or more gateways 20 and the gateways 20 in turn communicating with one or more network servers 22, such as to facilitate upstream communications from the endpoints 14 to the network servers 22 and/or downstream communications from the network servers 22 to the endpoints 14. The endpoints 14, gateways 20 and servers 22 may optionally be configured in the illustrated manner such that the endpoints 14 wirelessly communicate with the gateways 20 and the gateways 20 in turn wiredly communicate with the network servers 22. One non-limiting aspect of the present invention contemplates the endpoints 14 being configured to wirelessly communicate and/or broadcast, optionally asynchronously, when desiring to transmit their associated data, readings, measurements or other information associated with the use thereof.

The data being broadcasted from the endpoints 14 may be received at multiple gateways 20 depending on the number of gateways 20 within the vicinity, beamforming parameters and other variables due to the endpoints 14 optionally communicating upstream in a non-mesh or connectionless manner. The endpoints 14 may be battery-operated and employ a long range, low power wireless protocol to facilitate communication of the desired data. The endpoints 14, for example, may send small data packets to any number of gateways 20 within a several-kilometer range thereof, optionally being limited to 1,000 bytes of data per day or less than 5,000 bits per second. The gateways 20 may then use more traditional communications, such as wired Internet connections, to forward the messages to a network-server 22 which validates the packets and forwards as appropriate.

The endpoints 14 may optionally employ a physical layer that uses chirp spread spectrum (CSS) modulation, such as with a spreading factor (SF) of 7 to 12, to deliver orthogonal transmissions at different data rates. The CSS may employ wideband linear frequency modulated chirp pulses to encode information within a sinusoidal signal whose frequency increases or decreases over time, optionally throughout an entire allocated bandwidth, so as to broadcast its data in a manner resistant to channel noise, resistant to multi-path fading when operating at very low power due to a broad band of spectrum use, and with reliance on the linear nature of the chirp pulse to avoid having to add pseudo-random elements to the signal for purposes of distinguishing it from noise on the channel. The endpoints 14 may optionally be deployed and begin transmitting data without prior association or synchronization with the gateways 20, i.e., the endpoints 14 may be pre-configured or otherwise operational when deployed so as to avoid having to expend battery energy to synchronize with the gateways 20 and/or to otherwise exchange signaling with the gateways 20 prior to having data desired for transmission thereto. The number of gateways 20 receiving transmissions from any one of the endpoints 14 may be based on the transmission range of the endpoint 14 and the number of gateways 20 positioned within that transmission range by a corresponding LPWAN operator.

The spatial diversity created by multiple gateways 20 receiving a single transmission from one or more of the endpoints 14 may be beneficial in facilitating error correction and other signal processing techniques. When multiple gateways 20 receive the same transmission, each of the gateways 20 may optionally be configured to forward the corresponding signaling to the network servers 22 whereupon the network servers 22 then verify, authenticate or otherwise process the associated data such that a single packet or single transmission/message is thereafter made available, e.g., such that a single packet or transmission is provided to downstream devices for further processing. The ability to push or delay the associated signal processing to the networks servers 22 may be beneficial from an architectural and deployment standpoint as it may permit the corresponding operator to centralize the attendant processing to hubs or data centers, which may ameliorate buildout costs for the corresponding LPWAN 16, 18. The backend-influenced processing of the signaling at the network servers 22 may also be beneficial in enabling the endpoints 14 to conserve battery energy by not having to continuously or repeatedly synchronize with one or more of the gateways 20 and by alleviating any reliance on the endpoints 14 to facilitate forwarding or processing data for other endpoints.

The endpoints 14 may optionally operate according to a messaging strategy whereby communications may be essentially asynchronous in so far as the endpoints 14 limiting communications to intervals when having data to transmit. The endpoints 14 may conserve battery energy consumed in facilitating communications by waiting for an interval during which data is ready for transmission before consuming battery energy necessary for communication. A radio interface or other communication mechanisms of the endpoints 14 maybe shutdown or turned off during the non-data intervals such that the endpoints 14 are unable to receive downstream transmission or otherwise wirelessly communicate during the corresponding intervals. The radio interface may be woken up to consume battery energy when data is ready for upstream transmission, and optionally for a limited period of time thereafter, the radio interface may be kept temporarily operational to facilitate receipt of downstream communications. The LPWAL 12, gateways 20, network server 22 or other network construct may utilize the shortened interval after upstream transmission to facilitate sending acknowledgments and/or other information to the endpoints 14, such as to facilitate transmitting updates or other configuration information thereto. The broadcast nature of the endpoints 14 may be further advantageous in limiting battery consumption and memory storage as the endpoints 14 may broadcast the desired data without having to undergo synchronization or other exchange with the gateways 20 before transmission and without having to look up or otherwise store an address or communication requirement for an intended recipient.

One non-limiting aspect of the present invention contemplates the abstraction layer 12 being an LPWAN abstraction layer (LPWAL) to facilitate normalizing data broadcasted or otherwise transmitted from the endpoints 14 communicating to an LPWAN 16, 18 prior to the data being communicated to applications 26 intending to make use thereof. The applications 26 may connect with the LPWAL 12 through the Internet or other suitable communication medium to facilitate processing endpoint originating data for any number of reasons, including those particularly suitable to the Internet of things (IoT) where many applications may intend to make use of a vast amount of data collected by battery-operated endpoints of the type suitable for use with LPWANs 16, 18 and/or other network architectures. The LPWAL 12 is believed to be particularly beneficial in the illustrated configuration to facilitate normalizing data across multiple LPWANs 16, 18, which may be serviced by multiple LPWAN operators, so as to facilitate normalizing data when collected and/or communicated according to disparate protocols, languages, formats, syntaxes, structures, etc. of the endpoints 14 and/or the LPWANs 16, 18 or LPWAN operators, and thereby, enable commonization of the data prior to being interfaced with the applications 26 intending to make use thereof.

The future of IoT and other architectures relying on vast amounts of data to be collected from endpoints 14 across different networks and/or different network operators may present a problem for deployed applications 26 and new applications 26 to make use of the data due to the disparate processes, protocols, architectures, properties, etc. being independently used by the endpoints 14 for structuring, formatting and communicating the data. Requiring the applications 26 to not only identify each of the disparate characteristics of the endpoints and/or the LPWANs 16, 18 but also to include capabilities sufficient for making use of the attendant data may be particularly problematic when one application is faced with processing sensor data from a great number of disparate endpoints 14. When an application 26 desires temperature readings, for example, the corresponding endpoints 14 may use different protocols, formats, etc. to facilitate communication of the temperature readings or the raw data forming the temperature readings, which in the absence of the LPWAL 12, would require the application 26 to include procedures for addressing each manner that the raw temperature values are being communicated. It could become untenable for a single application 26 to handle thousands and thousands of sensors when disparately generating such raw temperature values. The LPWAL 12 can alleviate the processing constraints on the individual applications 26 by acting as a virtualization layer having a unified interface sufficient to normalize the data from thousands and thousands of endpoints 14 prior to the data reaching the applications 26.

The LPWAL 12 may sit above the LPWANs 16, 18, which themselves may be employing differing LPWAN technologies, and may be owned by one or more LPWAN operators. The LPWAL 12 may provide a unified interface across LPWAN technologies and/or operators sufficient to provide a single interface to the application 26. The LPWAL 12 enables a vendor to deploy LPWAN endpoints 14 across any set of geographic markets without knowing which subset of LPWANs 16, 18 is used and without knowing the endpoint LPWAN technology being employed by a particular LPWAN operator. The LPWAL 12 can provide a common Internet interface (across LPWAN technology and operator) to which the application 26 can connect for communication with the endpoints 14. The LPWAL 12 may provide the following functionality: physical device identifier to application vendor ID mapping; translation of per device and LPWAN operator sensor data encoding to human readable, LPWAN operator and application vendor independent sensor data encoding; creation of virtual endpoint data from physical endpoint data per application ID; interface for vendor data collection (e.g., websocket); collect accounting information about the volume of data traffic per LPWAN; interface for application vendor provisioning and management of devices, hiding which LPWANs are involved; and/or data forking for archival purposes An application 26 or a vendor of an application 26 may operate independently of the endpoints 14, i.e., the application 26 may be un-associated with an endpoint 14 or beyond the control thereof. The present invention, however, predominately describes for exemplary purposes that a vendor of the application 26 may be responsible for identifying the endpoints 14 intended to be operable therewith. The application vendor derived knowledge of the endpoints 14 may be provided to the LPWAL 12 to enable virtually any application vendor to itself deploy any type of endpoint 14 across any number of disparately operating LPWANs 16, 18 and/or utilize virtually any type of endpoint 14 already deployed and/or deployed by other vendors or operators across any number of disparately operating LPWANs 16, 18. The endpoint vendors, which may in some instances be the same as the application vendors, may deploy the endpoints 14, e.g. sensors, by subscribing to an LPWAN operator's service. A business relationship can be established between the vendors and one or more of the LPWAN operators to permit access to desired services whereafter the corresponding LPWAN operator may be required to maintain the business relationship with the vendor directly, which may be beneficial in allowing the LPWAL 12 to operate independently and without having to store or manage the details or the operational requirements attendant to the various services and access that different LPWAN operators may employ to access their LPWANs 16, 18.

The LPWAL 12 may be a software construct or other logically functioning element operating at a data center or other location sufficient to facilitate interacting with LPWANs 16, 18 associated with different LPWAN operators, and is described for exemplary non-limiting purposes as being a device with a controller 28 sufficient to facilitate the operations contemplated herein. The controller 28 may be associated with a processor and a non-transitory computer-readable medium having a plurality of non-transitory instructions stored thereon and operable/executable with the processor to facilitate the operations and processes described herein. The LPWAL 12 and/or the device associated therewith may include additional hardware, elements, circuits and the like to facilitate the operations contemplated herein, including those associated with facilitating wired and/or wireless communications over virtually any type of wireless and/or wired network. The LPWAL 12 is shown to include one or more LPWAN interfaces 30, a message handler 32 and one or more application interfaces 34 to illustratively demarcate functional performances contemplated in accordance with the present invention to facilitate normalizing data for virtually any endpoint 14 without requiring the utilizing application to perform data conversions or otherwise track disparate operating requirements of the data-providing endpoints 14.

The application interface 34 may be utilized to facilitate interfacing signaling with the application 26, which may include enrolling endpoints 14 by generating the following information for each endpoint 14 contemplated for use: a device ID (deviceID); geolocation (expected distribution geographic market) and/or an application identifier (appID) for the application intended to be used therewith. The controller 28 may generate a new appID for a new vendor application 26 in the event an appID has not already been provided and/or if the application 26 is desiring to have a separate identifier, which may be beneficial to facilitate use with different sets of translation instructions as described below in more detail. The LPWAL 12 may provide the appID to the appropriate vendor for subsequent association with the endpoints 14 desired to be enrolled for use therewith, i.e., to facilitate associating an application 26 intended to make use of data provided from the corresponding endpoints 14. The LPWAL 12 may provide the following information per enrolled endpoint 14 to the vendor via the same interface 34 in response to the enrollment request: deviceID, which may be generated in the form of a globally unique IEEE (DevEUI); and application key (appKey) as an encryption key for joining network; and the appID.

The application 26 and/or other non-application based vendors may access LPWAL 12 to obtain data originating from the endpoints 14 via a defined websocket interface 34 using reasonable internet defined security mechanisms, such as SSL and TLS over HTTP. This access may be facilitated with one of the application interfaces 34 acting more like a data interface and/or through another interface so as to enable the LPWAL 12 to provide normalized data, such as appID, deviceID and device data. The vendor's application 26 can use the data interface 34 to send/receive endpoint messages to/from its endpoints 14. The message format may be standard and independent of the endpoint LPWAN technology and operator. Historical endpoint data may be collected in the LPWAL 12 and available over the interface 34, depending on business agreements between the LPWAN operator, LPWAL 12 and application vendor. The LPWAN vendor can provide the LPWAL 12 with endpoint message format information preferred by the application vendor that is to be used for message translation as described in more detail below.

The LPWAN operator may communicate with and/or provide an interface 30 to the LPWAL 12 for sending/receiving messages (on behalf of the application vendor) to/from that application vendor's endpoints deployed in the LPWAN operator's network 16, 18. The message format may be specific to the operator's LPWAN 16, 18. The LPWAL 12 can collect message usage information associated with each application 26 and make that available to the LPWAN operators such that each operator can receive information by the application 26 for the messages traversing its LPWAN 16, 18. The corresponding information may include: total bytes sent and received by the application per accounting interval; total messages sent and received by the application per accounting interval; and/or total endpoints transmitting per LPWAN 16, 18.

Messages sent by endpoints 14 may be received at the LPWAL 12 from the corresponding LPWAN operator in a LPWAN-specific format. These messages may then be translated with the message handler 32 in accordance with the present invention into a common message format using the translation information previously provided by the application vendor. The following provides example output of the LPWAL 12:

```
{
    "DevEUI": "008000000000C116",
    "DevName": "ExampleAppVendor",
    "AppType": 3,
    "SeqNum": 0,
    "TimeStamp": 1476811505267,
    "SensorData": {
        "PA": "86.30",
        "TCB": "18.14",
        "HUMB": "24.3",
        "PLV1": "0.00",
        "PLV2": "0.00",
        "PLV3": "6.43",
        "ANE": "3.20",
        "WV": "2"
    }
}
```

The foregoing message may then be sent over the appropriate interface 34 to the vendor's application 26 whereby the appropriate interface 34 is determined by mapping endpoint identifiers in the message to the vendor application identifier, which may have been provided by the LPWAN operator when subscribing to the LPWAL 12. Specified subsets of message data sent by endpoints 14 may be archived by the LPWAL 12 based on business agreements between the LPWAL 12 and the application vendor. Messages sent by the application 26 to endpoints 14 may be in a common format when received by the LPWAL 12 whereupon they may be translated into the appropriate LPWAN format before being forwarded to the LPWAN operator for transmission to the endpoint 14. Message and byte count information per application vendor and LPWAN operator may be collected and reported by the LPWAL 12. In this manner, the present invention contemplates the performing or otherwise facilitating performance of the following functions: a vendor registering an application 26 with the LPWAL 12; the LPWAL 12 generating a new appID, if new vendor application; a vendor registering the endpoints 14 with the LPWAL 12; the LPWAL 12 associating the endpoints 14 to assigned appID; the LPWAL 12 enrolling the endpoints 14 in participating LPWANs 16, 18; the LPWAL 12 associating the LPWAN 16, 18 assigned AppEUIs with assigned appID; and/or the vendor deploying the endpoints 14 in the LPWAN operators' networks 16, 18.

An endpoint activation may commence with a vendor creating an account (one time) on the LPWAL 12, which may include agreeing to license terms. An application 26 may thereafter be registered under that account with the LPWAL 12 by the vendor providing an IEEE application global identifier (appEUI) and an application secret key (appKey). The LPWAL 12 may thereafter create an application ID (appID) which can be provided back to the vendor. The appID can be used as an authentication token when the vendor's application 26 communicates with the LPWAL 12. While any particular device activation may be suitable, the present invention notes the use of over-the-air activation (OTAA) and activation by personalization (APB) particularly suitable. The vendor can register the endpoints 14 with the LPWAL for later OTAA by providing each endpoint's device global identifier (deviceID) over a web interface. The web interface URL can contains the vendor's appID to identify which vendor application 26 will be associated with the endpoints 14. The application vendor can provide information required by the LPWAL 12 to translate messages between the endpoint-specific format and the common format used between the LPWAL 12 and the application 26. The LPWAL 12 can provide the common message format in the JaysScript Object Notation (JSON), such as in accordance with, the JSON Data Interchange Syntax specification, ECMA-404, 2nd Edition, December 2017, the disclosure of which is hereby incorporated by reference in its entirety herein. For each deviceID, the application vendor may be requested to populate the JSON message format to encode/decode that deviceID-specific data. The application vendor can provide a web service that the LPWAL 12 can be used to download that JSON encoding information when endpoints 14 are registered. It may be the responsibility of the application vendor to maintain that JSON information, i.e., to ensure the LPWAL 12 has sufficient instructions for automatically normalizing data when received from the endpoints 14.

An endpoint deployment may commence with the LPWAL 12 providing an interface identifying participating LPWAN operator that the vendor can then use to deploy its endpoints 14 by contracting for service with a corresponding LPWAN operator participating in the LPWAL 12. Prior to deployment, each endpoint 14 may be configured by the vendor to include a deviceID, the appKey and the appID. The LPWAL 12 can thereafter maintain a relationship between the appKey of the LPWAN operator and the appID and appKey. Once endpoints 14 are deployed, the endpoints 14 may thereafter be activated by going through the over-the-air activation process, defined by the specific LPWAN specification (e.g., LoRa Alliance, 3GPP), with the LPWAN operator's equipment. Messages sent by an endpoint 14 with a given appID may be routed through a corresponding one of the LPWANs 16, 18 for receipt at the LPWAL 12. The LPWAL 12 can then translate the message into a common format, replace the appID with the vendor assigned appEUI, and forward the common format message to the vendor application interface corresponding to that appEUI. A vendor's application can send a common format message over an LPWAL interface using an appID to a particular endpoint identified by a deviceID. The LPWAL 12 infers the appropriate appKey from the appID, translates the message in a manner appropriate to the LPWAN technology and forwards the message to the appropriate LPWAN operator interface 34 for the deviceID. The LPWAL 12 caches the appKey correlated with an endpoint transmission for receive window timeframes. The appID correlates the deviceID to the cached appKey for receive transmissions during the prescribed receive window to ensure data is routed correctly. The LPWAL 12 may maintain information indicating the number of bytes and messages sent and received per accounting interval, such as according to appKey and LPWAN operator. The LPWAL 12 can send per accounting interval data to participating application vendors and LPWAN operators. LPWAN operators may receive the data by application vendor and appKey, and the application vendors may receive the data by LPWAN operator and appKey, which may optionally also be available through the application vendor's LPWAL account.

Figure 2:
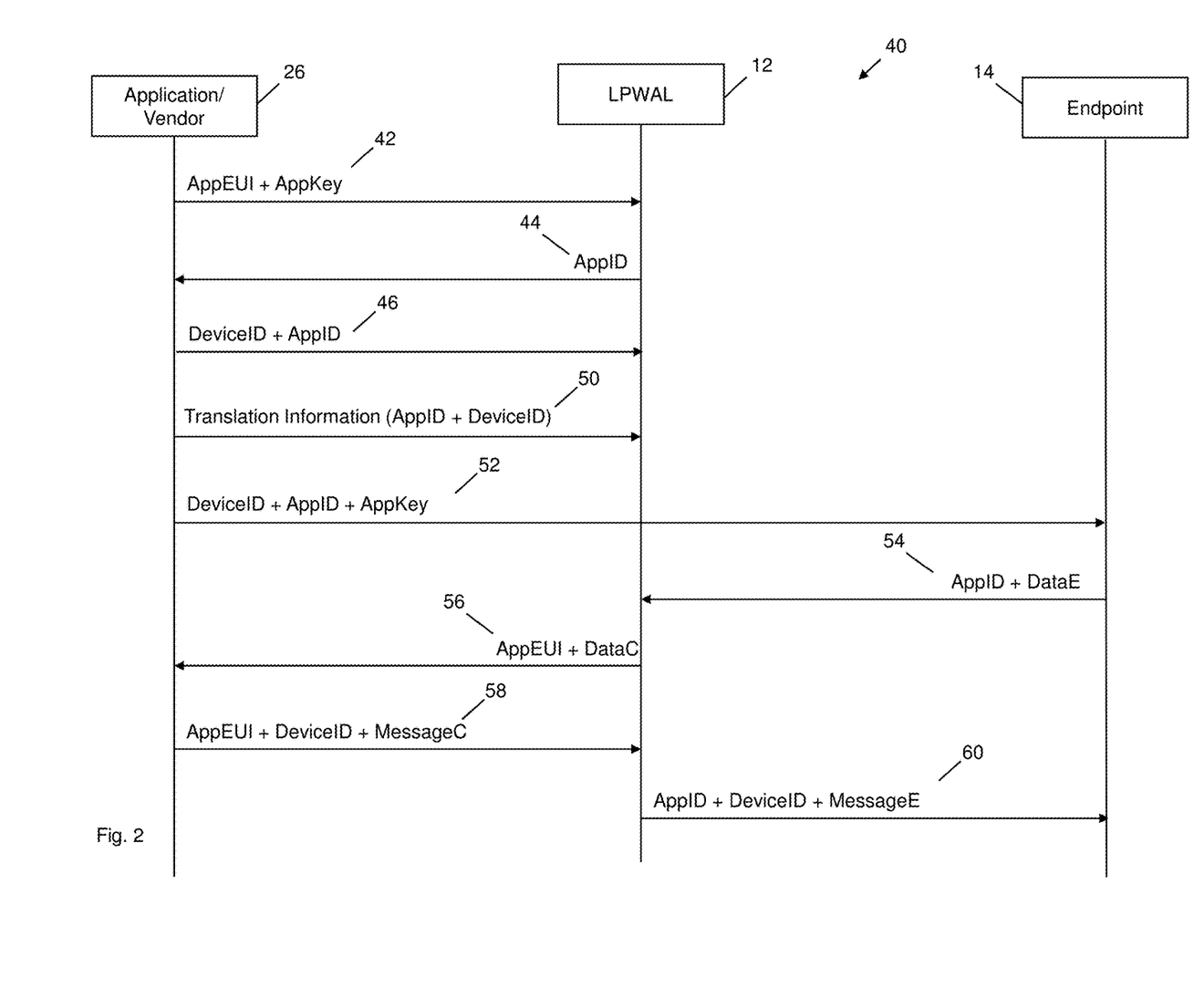
FIG. 2 illustrates a flowchart for a method of normalizing data in accordance with one non-limiting aspect of the present invention.

FIG. 2 illustrates a flowchart 40 for a method of normalizing data in accordance with one non-limiting aspect of the present invention. The method is predominately described with respect to the exemplary description provided above in regards to normalizing data originating from a plurality of endpoints 14 in communication with one or more LPWANs 16, 18. One aspect of the method relates to performing data normalization at a virtualization layer or LPWAL 12 located upstream from the endpoints 14 so as to facilitate data normalizing without adding processing or energy consumption constraints on the endpoints 14, which may be helpful for endpoints 14 operating solely on energy provided from a battery and/or those essentially, asynchronously communicating using wireless, broadcast or connectionless communications with LPWANs 16, 18. The method, regardless of endpoint limitations, may be additionally beneficial in normalizing data when collected and/or communicated according to disparate protocols, languages, formats, syntaxes, structures, etc., such as to enable commonization of the data prior to being interfaced with applications or other entities intending to make use thereof.

An application enrollment request process may commence with a vendor 26 contacting the LPWAL 12 through one of the application interfaces 34, such as with communication of an enrollment request message 42. The enrollment request message 42 may include a globally, unique appEUI for a particular application 26 the vendor desires for enrollment, and optionally, an appKey to be used in facilitating encryption of data to be used with the application 26 being enrolled. The enrollment process may occur after the vendor has established a business relationship with one or more LPWAN operators, e.g., after the vendor has agreed to service terms for data to be communication over one or more of the LPWANs 16, 18. The nature of the business relationship(s) may be kept or maintained directly between the vendor and the associated LPWAN operators. The enrollment request process may optionally include the vendor providing network identifiers, addresses or other information sufficient for identifying the LPWANs 16, 18 included as part of the business relationship or that the vendor has otherwise secured access to. The network identifiers may be included within the enrollment request message or otherwise transmitted to the LPWAL 12 to facilitate associating with the application 26 being enrolled, which may be beneficial in parsing or ignoring data communicated over LPWANs 16, 18 having network identifiers of failed to match with those enrolled with the LPWAL 12.

An application association process may occur when the LPWAL 12 associates an application ID (appID) with the application 26 being enrolled. The appID may be a randomly generated series of values or non-globally unique values determined by the LPWAL 12 for cross-referencing with the appEUI and/or appKey provided in the enrollment request message 42. The LPWAL 12 may include a database, a table or a lookup mechanism to facilitate relating the appID with the application being enrolled. The appID may be useful in facilitating identification of particular applications 26 enrolled with the LPWAL 12 differently than how those applications 26 would be identified according to the appEUI, which may be beneficial in allowing the LPWAL 12 to enhance security as the appID may be unusable or undecipherable to entities snooping or otherwise tracking data/packets being communicated through the LPWAL 12 whereas the appEUI, particularly when in compliance with a globally known identification standard, may be more readily usable or decipherable by such entities. The LPWAL 12 may provide the appID to the requesting vendor within an application ID message 44, which may optionally be encrypted according to the appKey and/or include a reference or another relation to the previously provided appEUI for use by the vendor in generating its own relationship between appID and appEUI and/or appKey.

A device enrollment process may occur when the vendor has successfully enrolled a particular application with the LPWAL 12, i.e., after the vendor has attained an appID. The device enrollment process may generally correspond with the vendor notifying the LPWAL 12 of the endpoints 14 intended to be used with a particular application, such as by transmitting a device enrollment message 46 having a device ID of each endpoint 14 and the appID of the application 26 to be associated therewith. The vendor may facilitate execution of the device enrollment process at any time to notify the LPWAL 12 of endpoints 14 being newly added for use with the application 26, to facilitate dynamic or moving endpoints 14 or to otherwise apprise the LPWAL 12 of endpoint association updates. The deviceIDs may optionally be updated with each transmission of the device enrollment message 46 to facilitate adding and/or removing devices 14 authorized for use with the associated application/appID, which may be beneficial in preventing normalization of data communicated from endpoints 14 no longer listed within the device enrollment message 46 or otherwise noted within the device enrollment message 46 as lacking rights or entitlements for use with the application 26.

A translation enablement process may occur with the vendor providing translation information to the LPWAL 12. The translation information may be transmitted in one or more translation messages 50 and include instructions, scripts, executable code, JavaScript and/or other information necessary to facilitate normalizing disparate data originating from the endpoints to an agreed-upon or standardized architecture, format, syntax, protocol, structure, language or other construct. The message handler 32 of the LPWAL 12 may be the functional element utilized for facilitating normalizing, translating, mapping or otherwise encoding/converting data being received from the endpoints 14 to a singular format or form such that the application 26 making use thereof need not compensate for the disparate nature of the data as originating from the endpoints 14, i.e., the application need only be capable of processing the data according to one type of messaging structure. One non-limiting aspect of the present invention contemplates the message handler 32 normalizing the data and/or generating the messages used to carry the data to the applications in accordance with JavaScript Object Notation (JSON) format or other suitable language-independent, human readable or text-based syntax.

The ability of the LPWAL 12 to automatically normalize data from virtually any endpoint to the JSON format, or other agreed-upon structure, may be particularly beneficial in enabling the present invention to support communication of sensor data or other information without burdening the applications 26 and/or the endpoints 14 with related data conversions. The translation information may be provided from the vendors to the LPWAL 12 in a computer-usable format such that the message handler 32 can automatically process the translation information and generate suitable maps, relationships, conversions and other processes necessary to automatically convert data being received from the endpoints 14 to the common format, i.e. JSON or the other agreed-upon format/structure. The translation information for a particular application 26 may be identified with the appID associated therewith such that the message handler 32 knows to automatically use the related translation information to facilitate normalization of data included with the messages having related appID therein. The translation information may include multiple sets of translation information for a particular appID to address disparate characteristics of the endpoints 14 generating the data, e.g., a set of translation information may be required for each different type of endpoint 14 or type of communication requirement of the endpoint 14 or the associated LPWAN 16, 18. The deviceID may optionally be used in this regard to facilitate differentiating sets or subsets of the translation information to be used for a particular endpoint with respect to a particular appID with respect to a particular appID, e.g., the appID can be used to identify the appropriate translation information and the deviceID can be used thereafter to determine one or more portions of the translation information to be used.

One non-limiting aspect of the present invention contemplates relying on the vendors to provide the translation information in order to avoid the LPWAL 12 having to independently determine the translation information on a per endpoint basis. Requiring the vendors to instead generate the translation information, and optionally provide updates or other changes are thereto to the LPWAL 12, may be beneficial from a commercial implementation standpoint as requiring an entity charged with operating LPWAL 12 to individually map endpoint characteristics for thousands or millions of endpoints may be commercially impracticable. Requiring the vendors to generate the translation information may also be beneficial in motivating or ensuring the entity mainly benefiting from the data conversions, or at least the entity capable of passing through the cost for generating the translation information to an end customer, can be held responsible for keeping the translation information relevant/accurate as endpoint operating characteristics change over time and/or as authorized endpoints 14 are added and removed, which may be important in maintaining customer satisfaction and quality of service as the use of IoT and non-IoT endpoints 14 proliferate.

An endpoint provisioning process may correspond with the vendor providing the deviceID, appID and appKey to each of the endpoints 14 intended to be used with the application being enrolled. The endpoint provisioning process may include transmitting the corresponding information to the endpoint 14 within an endpoint provisioning message 52, such as when the endpoint 14 is activated and/or during one of the brief intervals after an endpoint 14 transmits upstream data during which the endpoint 14 is capable of temporarily receiving downstream data, and/or through technician servicing or other configurating of the endpoint 14 prior to deployment, such as during manufacturing or installation. The endpoints 14 may process the deviceID, appID and appKey to facilitate identifying itself (deviceID) within messages used to transmit data along with the application intended for use therewith (appID) and any attendant encryption (appKey). While the present invention fully contemplates the LPWAL 12 facilitating signaling with endpoints 14 for purposes of the provisioning process, the endpoints 14 may optionally be provisioned independently of signaling communicated from or through the LPWAL 12 to avoid corresponding processing and implementation demands on the LPWAL 12 in having to track endpoints individually or to otherwise be aware of endpoint presence/operation. The LPWAL 12 may be considered as being reactive to messages received from the endpoints 14 as opposed to being actively involved in configuring or synchronizing endpoints 14 for generating the messages/data being communicated therefrom.

A normalization process may commence with the endpoint 14 issuing an endpoint message 54 to one or more of the LPWANs 16, 18. The endpoint message 54 may include data generated by the endpoint (dataE), the appID of the application intended to process the dataE and/or the deviceID associated therewith. The dataE may be raw data sensed, tabulated, calculated, monitored or otherwise generated at the endpoint 14 and thereafter intended to be formatted according to requirements of the endpoint 14 and/or the LPWAN 16, 18 associated therewith, i.e., according to disparate or dissimilar formats than that required by or necessary to work with the vendor/application 26 associated therewith. While sharing the appID with the endpoint is contemplated, one non-limiting aspect of the present invention anticipates maximizing security by keeping the appID secret from the endpoints 14 and/or the LPWANs 16, 18, i.e., by limiting sharing of the appID to communications between the vendor and the LPWAL 12. The secrecy of the appID may be useful in keeping entities from utilizing the translation instructions provided to the LPWAL 12 to facilitate normalizing the dataE for other applications or uses. The LPWAL 12 may process the dataE included within the endpoint message according to the normalization instructions previously associated with the appID and/or the deviceID included within the corresponding endpoint message.

The normalization process may thereafter continue with the LPWAL transmitting a normalized message 56 having the dataE as normalized or converted to a common data format (dataC), e.g., a JSON format, and the appEUI associated with the appID included in the endpoint message 54. The normalization message 56 may include the dataE being normalized to the dataC according to the translation information previously associated with the corresponding appID and/or device ID. The appID may be solely relied upon in situations where the application vendor intends to have the dataE uniformly translated according to a singular set of translation instructions associated with the appID, i.e., when one set of translation instructions associated with the appID is sufficient to facilitate the desired data normalization. The deviceID may be utilized in cooperation with the appID to facilitate selecting subsets of translation information associated with a particular appID. The LPWAL 12 may select the subset of translation instructions associated with a particular appID based on the LPWAN 16, 18 of the corresponding endpoint 14, e.g., a range or grouping of deviceIDs may be associated with translation instructions differentiated within the subsets according to LPWAN 16, 18. The LPWAL 12 may additionally and/or alternatively select the subset of translation instructions associated with a particular appID based on a per-endpoint basis, e.g., individual deviceIDs may be associated with translation instructions differentiated within the subsets according to deviceID.

The translation information utilized by the LPWAL may be determined on a message-by-message packet-by-packet basis such that the message handler 32 individually assesses each arriving endpoint message to determine the appropriate translation information to be used in facilitating converting its formatting to JSON or another predefined format operable with the associated vendor/application 26, which may optionally include converting the incoming messaging to differing formats in the event the application 26 is configured to process multiple data formats. The LPWAL 12 may utilize different translation instructions to normalize data intended for the same application, i.e., different translation instructions to convert data to a common format, if communicated from different endpoints 14 when the raw data within the corresponding endpoint messages 54 is formatted differently or otherwise subjected to disparate processing techniques, such as when the endpoints 14 process raw data identically or similarly but format or communicate the data differently due to requirements of the LPWAN 16, 18 associated therewith and/or when the endpoints 14 are connected to the same LPWAN 16, 18, i.e., subjected to the same LPWAN communication requirements, but disparately or dissimilarly encode or otherwise prepare the raw data for transmission. In the event the LPWAL lacks suitable translation instructions or an error occurs, the raw data may be transmitted to the application either in conjunction with the converted data or instead of the converted data.

An endpoint communication process may occur with the vendor and/or application 26 transmitting downstream message 58 in response to receipt of the normalization message 56, such as to facilitate transmitting an acknowledgment to the corresponding endpoint 14. The downstream message 58 may be timed relative to a brief interval that the endpoint 14 may be kept awake to receive downstream messages following transmission of the endpoint message 54. The LPWAL 12 may translate data (messageC) included in the downstream message, which may be formatted identically to the dataC, to data (messageE) suitable for use with the endpoint, which may be formatted identically to the dataE. The LPWAL 12 may facilitate the downstream transmission normalization according to the translation information previously utilized in facilitating authorization of the dataE included in the endpoint message 54. The LPWAL 12 may thereafter transmit an endpoint normalization message 60 to the corresponding endpoint 14. Following transmission of the an endpoint normalization message 60 or at any other desire point in time, the LPWAL 12 may generate reports or other information regarding statistical analysis of translations and other messaging passing therethrough, such as to apprise vendors in session or LPWAN operators of usage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A low power wide area network abstraction layer (LPWAL), comprising:
   a low power wide area network (LPWAN) interface interfacing with a plurality of LPWANs, each of the plurality of LPWANs including:
   i) at least one network server,
   ii) at least one gateway,
   iii) a plurality of endpoints, the plurality of endpoints being solely battery-operated devices, and
   iv) wherein the at least one network server interfaces with the LPWAN interface and the at least one gateway, and the plurality of endpoints interface with one or more of the at least one gateway;
   an application interface interfacing with at least one application connected thereto via the Internet or other communication network;
   a message handler interfacing messages between the LPWAN interface and the application interface, the message handler normalizing data carried within messages received at the LPWAN interface such that disparate data formats employed therewith are normalized to a common format prior to being interfaced to the at least one application via the application interface;
   a processor and non-transitory computer-readable medium having a plurality of non-transitory instructions executable with the processor, the plurality of non-transitory instructions being sufficient to facilitate:
   receiving a plurality of translation instructions from a plurality of applications, the plurality of translation instructions being sufficient for normalizing the data carried within the messages received at the LPWAN interface according to formatting characteristics of the plurality of endpoints and the LPWAN associated therewith,
   controlling the message handler on a message-by-message basis to lookup one or more of the plurality of translation instructions for each message received at the LPWAN interface, and based thereon, normalize the data included therewith prior to the data being interfaced to the at least one application,
   collecting accounting information for each of the plurality of LPWANs, the accounting information including a volume of data traffic for each of the LPWANs, and
   transmitting an accounting report to each operator associated with the plurality of LPWANs, the accounting report including the accounting information.

2. The LPWAL of claim 1, wherein the plurality of non-transitory instructions are sufficient to facilitate an endpoint registration process for each of the plurality of endpoints, the endpoint registration process including:
   receiving a plurality of application global identifiers (appEUI) from vendors associated with each of the plurality of applications, the plurality of appEUIs globally and uniquely identifying one of the plurality of applications;
   receiving a plurality of device identifiers (deviceIDs) for the plurality of endpoints, the plurality of device identifiers globally and uniquely identifying one of the plurality of endpoints;
   generating a plurality of application identifiers (appIDs) for the plurality of applications as a function of the appEUIs, each of the appIDs being different than the appEUI; and
   generating a plurality of application keys (appKeys) for the plurality of appIDs, each of the appKeys uniquely encrypting messaging for the application associated with each of the plurality of appIDs.

3. The LPWAL of claim 1, wherein at least a plurality of the translation instructions normalize the data carried within the messages received at the LPWAN interface such that the data is translated from a non-JavaScript Object Notation (JSON) format to a JSON format.

4. The LPWAL of claim 1, wherein the plurality of endpoints:

operate according to a messaging strategy whereby a radio interface or other wireless communication mechanisms associated therewith to communicate with the gateways is shutdown or turned off during non-data intervals such that the endpoints are unable to receive downstream transmission or otherwise wirelessly communicate during non-data intervals; and the radio interface or other wireless communication mechanisms are woken up during data intervals to consume battery energy for purposes of transmitting data upstream to the gateways.

5. The LPWAL of claim 4, wherein the radio interface or other wireless communication mechanisms are kept temporarily operational during the data intervals following upstream transmission of the data to facilitate receipt of downstream communications from one or more the gateways.

6. A method for normalizing data from a wireless low power wide area network (LPWAN), the method comprising:

receiving, at an application interface of an abstraction layer, a plurality of translation instructions from a plurality of applications, the plurality of translation instructions being sufficient for normalizing data carried within messages received at a LPWAN interface of the abstraction layer according to formatting characteristics of a plurality of endpoints and the LPWAN;

using a controller of the abstraction layer, controlling a message handler of the abstraction layer on a message-by-message basis to lookup one or more of the plurality of translation instructions for each message received at the LPWAN interface of the abstraction layer, and based thereon, normalize data included therewith prior to the data being interfaced to the plurality of applications;

collecting accounting information for the LPWAN, the accounting information including a volume of data traffic for the LPWAN; and transmitting an accounting report to an operator associated with the LPWAN, the accounting report including the accounting information.

* * * * *